Jan. 15, 1924.
E. H. BRISTOL
1,481,047
CHART HOLDING DEVICE FOR RECORDERS
Filed Sept. 7, 1922
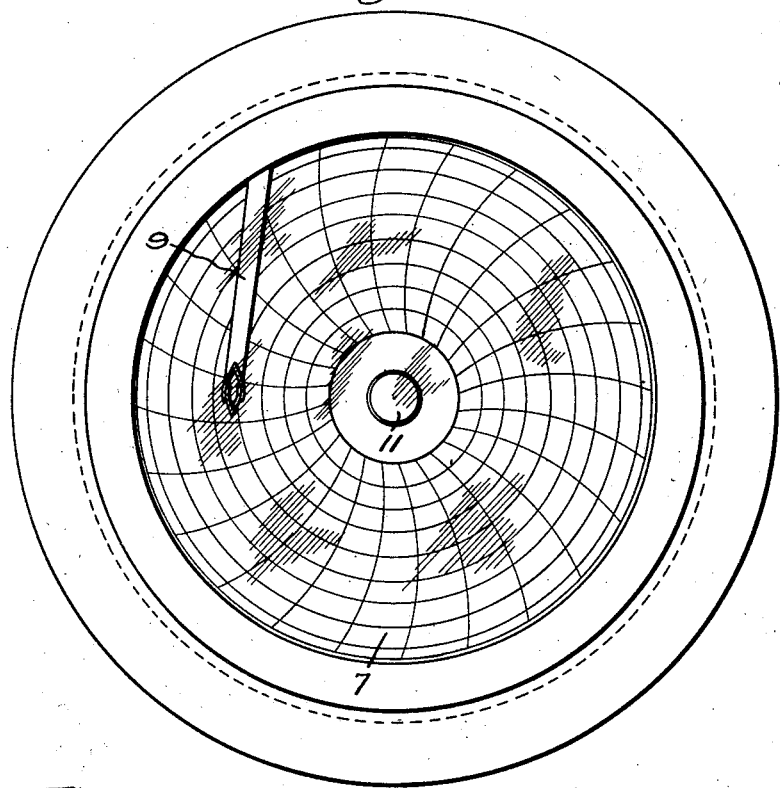
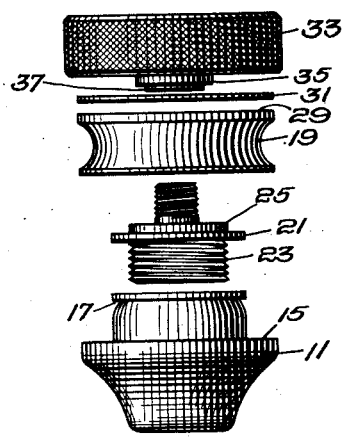
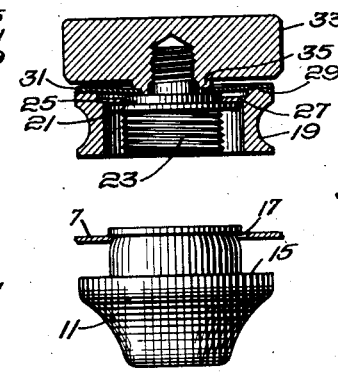
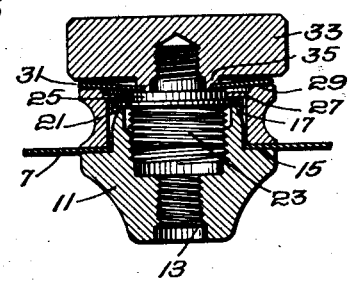
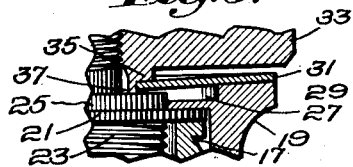
Inventor:
Edgar H. Bristol.

Patented Jan. 15, 1924.

1,481,047

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

CHART-HOLDING DEVICE FOR RECORDERS.

Application filed September 7, 1922. Serial No. 586,702.

*To all whom it may concern:*

Be it known that I, EDGAR H. BRISTOL, a citizen of the United States, and a resident of Foxboro, county of Norfolk, and State of Massachusetts, have invented an Improvement in Chart-Holding Devices for Recorders, of which the following description, in connection with the accompanying drawings, is a specification, like characters on the drawings representing like parts.

This invention relates to a device adapted to hold and support the rotating chart on such an instrument as a recording pressure gage. The object is to provide a conveniently and cheaply manufactured device of this nature and one which may be readily adjusted to clamp the chart, preferably with a fixed and predetermined pressure.

My invention will best be understood by reference to the following description of an illustrative embodiment thereof taken in connection with the accompanying drawings illustrating the same, wherein:

Fig. 1 is a front elevation of a recording pressure gage;

Fig. 2 is a side elevation on a larger scale of the elements which form a holding device or hub in separated position;

Fig. 3 is a part section, part elevation showing the parts in the position when the chart is being changed;

Fig. 4 is a central section of the parts assembled; and

Fig. 5 is a sectional detail on a still larger scale.

In Fig. 1 I have shown in elevation a recording instrument having a polar chart 7 adapted to be rotated beneath the marking pen 9 by suitable clock-work mechanism. These charts are changed from time to time and my invention particularly relates to the means whereby they are secured to the time shaft of the clock. Referring more particularly to Figs. 2, 3 and 4 of the drawings, I there show a hub 11 adapted to be secured, as by means of the threaded opening 13 (Fig. 4), to the end of the time shaft and this hub is provided with a rebate 15 against which the chart 7 may be clamped as shown in Fig. 4. The barrel of the hub which passes through the central opening in the chart may be provided adjacent its free end with a groove 17. The chart 7 may be positioned on the hub by hooking or buttoning the same into this groove as shown in Fig. 3 and the chart will be supported leaving the hands of the operator free to adjust the hub cap presently to be described, which will displace the chart downwardly along the barrel of the hub and seat the same on the rebate 15, as shown in Fig. 4.

The chart 7 is clamped against the face of the rebate 15 by means of a clamping sleeve 19 which in the embodiment of the invention shown is carried by a hub cap or nut made of two pieces. The inner piece of the cap has a body 21 provided with suitable means, such as the threaded shank 23, for attaching it to the hub 11 and is provided with a reduced portion 25. The sleeve 19 has an inwardly projecting flange 27 overlying the part 21 and surrounding the reduced portion 25 as illustrated in Fig. 3, but this reduced portion is made of greater height than the flange to provide for relative movement of the sleeve 19 on the cap. The sleeve 19 may be provided also with a raised margin 29 against which bears an annular spring disc 31, the inner margin of which overlies the reduced portion 25 of the inner piece of the cap. The outer piece of the cap may be a knurled nut 33 screwing onto the inner piece and having a portion 35 adapted to oppose the inner margin of the annular spring 31 and a reduced portion 37 adapted to extend through the opening in this spring and seat on the inner piece of the cap. The reduced portion 37 is made of greater depth than the thickness of the spring disc 31 and while the spring is mounted on the reduced portion 37 it is not clamped between the pieces of the cap but is loosely held as indicated in Fig. 5. This provides for the utilization of the full flexibility of the annular spring and permits the use of a thicker and longer lived disc to give a desired tension.

As illustrated in Fig. 3 the complete cap consisting of the two pieces as described, the sleeve and the spring, may be operated as a unit and for this purpose the thread securing the nut 33 in position is preferably of the opposite pitch to the thread 23 so that in unscrewing the cap from the hub 11 from the position shown in Fig. 4 the parts will not become disassembled. As appears in Fig. 3 when the cap is detached from the hub the expansion of the spring normally thrusts the sleeve 19 inwardly, that is, downwardly in the figure, the movement being limited by the seating of the flange 27. The entire cap shown in Fig. 3 may be secured to the hub 11 and in the assembling movement the sleeve will displace a chart placed loosely over the barrel of the hub, for instance, one held in the groove 17 if such a groove is utilized, and will press it inwardly against the rebate 15 as the cap is screwed or otherwise secured in position. As the parts go home the sleeve 19 will be displaced against the force of the spring 31, as illustrated in Fig. 4, and the sleeve 19 will thus resiliently clamp the chart 7. However, as the cap piece 21 seats on the hub 11 in this movement and can be screwed up no further than is shown in Fig. 4, the tension on the chart will always be of a fixed maximum.

I have described in detail the particular embodiment of my invention shown in the accompanying drawings. It will be understood, of course, that this embodiment is merely illustrative and that the construction might be widely varied within the principles of my invention. What I claim as new and desire to secure by Letters Patent I shall express in the following claims.

Claims:

1. A chart hub having a rebate to receive the chart, a clamping sleeve, a cap for attachment to the hub and a spring interposed between sleeve and cap.

2. A chart hub having a rebate to receive the chart, a clamping sleeve, a shouldered cap screwing home against the hub and a spring disc carried by the shoulder on the cap and bearing on the sleeve.

3. A chart hub having a rebate to receive the chart, a clamping sleeve, a cap having a reduced portion providing a shoulder and adapted to be screwed home on the hub and a spring disc surrounding said reduced portion and of less thickness than the depth thereof, said disc bearing on the sleeve.

4. A chart hub having a rebate to receive the chart, a clamping sleeve, a spring disc bearing on the sleeve, and a cap for tensioning the disc, said cap seating on the hub.

5. A chart hub having a rebate to receive the chart, a clamping sleeve, a spring disc bearing on the sleeve and a cap for tensioning the disc, said cap seating on the hub and in such position having loose engagement with the disc.

6. A chart hub having a rebate to receive the chart, a clamping sleeve and a cap screwing on the hub having provision for applying a yielding pressure of fixed maximum on the sleeve.

7. A chart hub having a portion against which the chart may be clamped and a cap for attachment to the hub and carrying a relatively movable part to clamp the chart, means for limiting the movement of the cap inwardly on the hub and spring means for pressing inwardly the movable part.

8. A chart hub having a portion against which the chart may be clamped and a cap for attachment to the hub and carrying a relatively movable part to clamp the chart, means for limiting the movement of the cap inwardly on the hub and a floating spring carried by the cap for pressing inwardly the movable part.

9. A chart hub having a rebate to receive the chart, a sleeve opposing the same, a cap screwing on the hub, the hub and cap having opposed surfaces limiting inward movement of the cap, a spring annulus bearing on the sleeve, the inner margin of the annulus being loosely held by the screwed on cap.

10. A chart hub having a rebate to receive the chart, a clamping sleeve having an annular flange and a cap having a reduced portion in which said flange plays and a spring normally pressing the sleeve inward.

11. A chart hub having a rebate to receive the chart, a clamping sleeve having an annular flange, a cap having a first reduced portion in which said flange plays and a second reduced portion, a spring bearing on the sleeve and received by said second reduced portion.

12. A chart hub having a rebate to receive the chart, an inner cap piece screwing home thereon, a clamping sleeve having a flange overlying said cap portion, a spring annulus overlying the flange and a second cap piece connected to the first through the opening of said annulus and having a surface acting on the same.

13. A chart hub having a rebate to receive the chart, an inner cap piece screwing home thereon, a clamping sleeve having a flange overlying said cap portion, a spring annulus overlying the flange and a second cap piece connected to the first through the opening of said annulus having a surface opposing the margin of said annulus and a reduced portion of slightly greater depth than the thickness of the annulus and adapted to extend through the opening therein for contact with the first piece.

14. A chart hub comprising two relatively movable parts having surfaces adapted to clamp the chart between them and means attached to one such part having provision for applying a yielding pressure of fixed maximum to the other part to press the two together.

15. A chart hub having a reduced portion and a clamping sleeve, said reduced portion being grooved to support the chart temporarily before adjustment of the sleeve.

In testimony whereof, I have signed my name to this specification.

EDGAR H. BRISTOL.